United States Patent [19]

Tsukahara et al.

[11] Patent Number: 4,775,417

[45] Date of Patent: Oct. 4, 1988

[54] COLOR DEVELOPER

[75] Inventors: Hirokazu Tsukahara; Shigetoshi Hiraishi, both of Tokyo, Japan

[73] Assignee: Mitsubishi Paper Mills, Ltd., Tokyo, Japan

[21] Appl. No.: 75,975

[22] Filed: Jul. 21, 1987

[30] Foreign Application Priority Data

Jul. 22, 1986 [JP] Japan ................................ 61-173502

[51] Int. Cl.[4] ............................................ C09D 11/00

[52] U.S. Cl. ...................................... 106/21; 503/216; 560/64

[58] Field of Search .......................... 503/216; 560/64; 106/21

[56] References Cited

U.S. PATENT DOCUMENTS

| | | | |
|---|---|---|---|
| 4,138,357 | 2/1979 | Igarashi | 503/216 |
| 4,503,244 | 3/1985 | Moller | 560/64 |

*Primary Examiner*—Theodore Morris

*Attorney, Agent, or Firm*—Cushman, Darby & Cushman

[57] ABSTRACT

A compound of the formula:

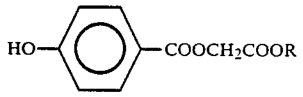

wherein R is a hydrocarbon group, is effective as a color developer in recording materials and particularly excellent in the image stability.

11 Claims, No Drawings

COLOR DEVELOPER

BACKGROUND OF THE INVENTION

This invention relates to novel color developers useful in recording materials, especially acid-base color formation type recording materials such as heat sensitive recording materials, carbonless pressure sensitive recording materials, etc. which utilize color forming reaction of normally colorless or palely colored basic leuco dyes with color developers which are acid substances.

Color developers which have been popular for this use include phenolic organic materials represented by 4,4'-isopropylidene diphenol (so-called bisphenol A), benzyl p-hydroxybenzoate, novolak type phenolic resins, zinc salts of salicylic acid derivatives, etc. inorganic solid acids represented by activated clay, silica-magnesia solid acids, etc. However, these materials have meits and demerits in practical performances and suffer problems to be solved.

Bisphenol A and benzyl p-hydroxybenzoate among the above known color developers have often been used as color developers for heat sensitive recording materials. Bisphenol A has a problem of difficulty in obtaining heat sensitive recording materials of high sensitivity. On the other hand, benzyl p-hydroxybenzoate is excellent in attaining high sensitivity, but there sometimes occurs the phenomenon of production of white fine crystals in color image areas formed by heat impression with lapse of time, so-called blooming phenomenon. This is a kind of undesired image deterioration.

Hitherto, organic or inorganic solid acids such as novolak type phenolic resins, zinc salts of salicylic acid derivatives, activated clay, silica-magnesia, etc. have been used in pressure sensitive recording materials. However, particularly inorganic solid acids are insufficient in fastness of color images formed, especially light-resistance.

SUMMARY OF THE INVENTION

An object of this invention is to provide a color developer free from the above problems.

That is, according to this invention there is provided a color developer for recording materials which comprises a compound represented by the following general formula:

(I)

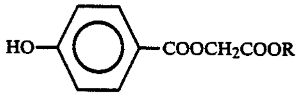

wherein R represents a hydrocarbon residue which may have a substituent.

DESCRIPTION OF THE PREFERRED EMBODIMENTS

The color developers provided by this invention are compounds represented by the following general formula:

(I)

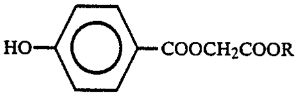

wherein R is an chain or cyclic alkyl group such as methyl, ethyl, isopropyl, n-propyl, n-butyl, cyclohexyl or the like; a chain or cyclic alkenyl group such as allyl, cyclohexenyl or the like; an aralkyl group which may have a substituent such as benzyl, p-chlorobenzyl or the like; or an aryl group such as phenyl, α-naphthyl, p-chlorophenyl or the like. That is, R may be defined to be a hydrocarbon residue which may have a substituent.

Noticeable characteristics of the color developer of this invention are that it is superior in compatibility with other coexisting organic materials such as basic dyes, sensitizing additives, high molecular materials as binders, etc. and it is stable and hardly be decomposed with light and the like.

Therefore, when the compound is used as a color developer in heat sensitive materials, not only increase of sensitivity can be advantageously attained, but also the compound is highly compatible with dyes, sensitizing additives, high molecular materials as binders in the portions where color has been formed with heat and it is never separated or precipitated even if kept in mixed state for a long time after cooling or after lapse of time, namely, no blooming phenomenon occurs.

Furthermore, when the compound of this invention is used in combination with an inorganic solid acid in pressure sensitive recording materials, it is also hardly decomposed and so, no yellowing occurs. Further, fastness of color image formed can be remarkably enhanced.

Next, recording materials which are main uses of the color developer of this invention will be explained below.

First, generally, a carbonless pressure sensitive recording material is composed of an upper sheet having on the back side a coat of microcapsules containing a solution of an electron donating, namely, basic colorless dye and a lower sheet having on the front side a coat of an acid substance, namely, electron accepting color developer. The colorless dye released from the microcapsules ruptured by application of pressure by writing, impact printers, etc. meets and reacts with the color developer to produce a color image.

A heat sensitive recording material comprises a support and coated thereon a solid colorless dye, a color developer and, if necessary, a sensitizing additive and others. When the coat is heated imagewise by a thermal pen, a thermal head, laser beam, electron beam, etc., the colorless dye reacts with the color developer in the heated area to form an image.

In addition to these recording materials, there are colorless dye heat transfer type image recording materials, electrical heat sensitive recording materials, etc., but mechanism of color formation is the same in all of these materials and the color developer of this invention can be used in any of these recording materials.

The compound of the general formula (I) can be synthesized by reacting an ester of an α-haloacetic acid, e.g., chloroacetic acid, bromoacetic acid or iodoacetic acid and an aliphatic or aromatic alcohol with p-hydroxybenzoic acid in the presence of an alkali. Generally, this reaction is carried out at a temperature of 120° C. or less, preferably 56°-100° C., for 2 days or more, preferably 2 to 5 days. Examples of the alkali used in this reaction are NaOH, KOH, etc. In this reaction, carboxyl group of p-hydroxybenzoic acid preferentially reacts with the α-haloacetic acid ester to release a hydrogen halide acid to attain condensation. Although hydroxyl group also reacts with the ester to some extent, the reaction product is in a slight amount and so is removed by the conventional purification procedures such as recrystallization, washing, etc.

Properties of the color developer of this invention can be fairly controlled by changing the alcoholic residue of the α-haloacetic acid ester which is a starting material, but substantial key point of this invention is introduction of $—CH_2COO—$ group.

The following Examples show synthetic methods for typical compounds of the novel color developers of this invention and effectiveness of the compounds in recording materials. In the Examples, all "parts" mean "parts by weight".

EXAMPLE 1

Synthesis of 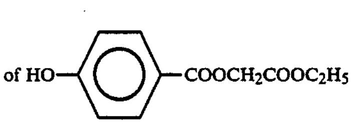

To 138 g of p-hydroxybenzoic acid were added 200 ml of acetone and further 300 ml of an aqueous alkali solution containing 48 g of sodium hydroxide to dissolve the p-hydroxybenzoic acid at room temperature. To this solution was added dropwise 184 g of ethyl monochloroacetate with stirring and this was heated under reflux on an oil bath for 48 hours. After concentration under reduced pressure, the residue was washed with an aqueous IN sodium hydrogen carbonate solution and further with water and white crystals were collected by filtration and were dried. Yield of crude crystals was 140 g. This was recrystallized from benzene to obtain a pure product (colorless needles) having a melting point of 94.0°-95.5° C.

Mass spectrometric analysis (FD method): $m/z=224$ (Calcd. $C_{11}H_{12}O_5=224$)

This crystal was mixed with crystal violet lactone and the mixture was heated to form deep blue color.

EXAMPLE 2

Synthesis of 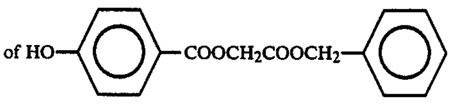

94 Grams of crude crystals were obtained in the same manner as in Example 1 except that 277 g of benzyl monochloroacetate was used in place of ethyl monochloroacetate. This was recrystallized from toluene to obtain a pure product (colorless leaflets) having a melting point of 132.0°-133.5° C.

Mass spectrometric analysis (FD method): $m/z=286$ (Calcd. $C_{16}H_{14}O_5=286$)

When this crystal was mixed with crystal violet lactone crystal and the mixture was heated, deep blue color was developed.

EXAMPLE 3

| | |
|---|---|
| Solution A | |
| 3-N,N—diethylamino-6-methyl-7-anilinofluoran | 1 part |
| 5% Aqueous hydroxyethyl cellulose solution | 6 parts |
| Solution B | |
| Color developer prepared in Example 2 | 1 part |
| 5% Aqueous hydroxyethyl cellulose solution | 6 parts |
| Solution C | |
| Stearic acid amide | 1 part |
| Calcium carbonate | 2 parts |
| 5% Aqueous hydroxyethyl cellulose solution | 10 parts |

The above solutions A, B and C were separately milled in a ball mill for 2 days and then were mixed at a ratio of A:B:C=1:5:3.

The mixture was coated on a fine paper of 60 g/m$^2$ at a coverage of 6 g/m$^2$ on solid basis, then dried at 60° C. and treated by super calender to obtain a heat sensitive recording sheet of 200-300 seconds in Bekk smoothness.

For comparison, a heat sensitive recording sheet was prepared in the same manner as above except that the known color developer, benzyl p-hydroxybenzoate was used.

Thus obtained heat sensitive recording sheets were tested on heat sensitive recording by a heat sensitive type facsimile machine (using thin film thermal head) to obtain normal black images.

So-called balck solid portion of these images was rubbed by fingers several times and left to stand in the dark at room temperature.

After one month, the portion was observed to find that white fine powders were precipitated on the black solid portion of the comparative sample (benzyl p-hydroxybenzoate as color developer) while substantially no white fine powders were seen on the sample of this invention.

EXAMPLE 4

| | | |
|---|---|---|
| Color deverloper prepared in Example 1 | | 40 parts |
| 5% Aqueous hydroxyethyl cellulose solution | | 40 parts |
| Water | | 20 parts |
| | Total | 100 parts |

The above were milled in a ball mill for 2 days.

100 parts of a silica magnesia solid acid SILTON SS-1 (manufactured by Mizusawa Chemical Co.) and 75 parts of the color developer dispersion wet milled hereabove were dispersed in 200 parts of water containing 1 part of sodium pyrophosphate and to the resulting dispersion were added 50 parts of 10% aqueous oxidized starch solution and 50 parts of 48% SBR latex to obtain a coating composition.

This was coated on a fine paper of 40 g/m$^2$ a coverage of 7 g/m$^2$ on dry basis and dried to obtain a lower sheet for carbonless pressure sensitive recording material. For comparison, a sample was prepared in the same manner as above with the exception of omitting the color developer of this invention.

For upper sheet, melamine resin microcapsules were prepared by encapsulization of a solution composed of 4 parts of crystal violet lactone, 1 part of Benzoyl Leucomethylene Blue, 0.5 part of 3-N,N-diethylamino-6-methyl-7-anilinofluoran and 100 parts of diisopropyl naphthalene and to 100 parts (dry basis) of the microcapsules were added 25 parts of wheat starch particles and 150 parts of 10% aqueous oxidized starch solution. The mixture was coated on a base paper of 40 $g/m^2$ at a coverage of 5 $g/m^2$ on dry basis to obtain an upper sheet.

Thus obtained lower and upper sheets were combined and pressed by super calender. After lapse of one day or more, blue color density on the lower sheet was measured and then the sheet was subjected to daylight exposure test.

In the comparative lower sheet, the initial density 0.70 decreased to 0.40 (retention rate 57%) after one hour of the daylight exposure test. On the other hand, for the lower sheet containing the color developer of this invention, the initial density 0.68 decreased to 0.50 (retention rate 74%). That is, in the sample of this invention, improvement in light resistance of color image was recognized.

As explained above, the novel color developer of this invention acts effectively especially as acid substance which is a fundamental component in acid-base color forming type recording materials. For example, heat sensitive recording materials containing the color developer show no deterioration of images formed and pressure sensitive recording materials containing it show improvement in light resistance of the images.

What is claimed is:

1. A color developer for recording materials comprising a compound of the formula:

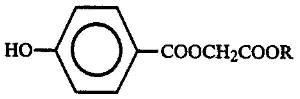

(I)

wherein R is a chain or cyclic alkyl group having 1 to 6 carbon atoms, a chain or cyclic alkenyl group having 6 or less carbon atoms, an aralkyl group which may have a substituent, or an aryl group.

2. A color developer according to claim 1, wherein R in the formula (I) is an alkyl group, a cycloalkyl group, an alkenyl group, a cycloalkenyl group, an aralkyl group, or an aryl group.

3. A color developer according to claim 1, wherein the compound of the formula (I) is

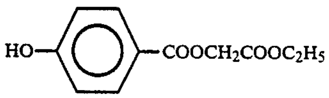

4. A color developer according to claim 1, wherein the compound of the formula (I) is

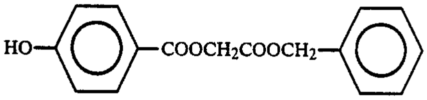

5. A color developer according to claim 1, wherein the alkyl group is a methyl group, an ethyl group, an n-propyl group, an n-butyl group, or a cyclohexyl group.

6. A color developer according to claim 1, wherein the alkenyl group is an allyl group or a cyclohexenyl group.

7. A color developer according to claim 1, wherein the aralkyl group is a benzyl group, or a p-chlorobenzyl group.

8. A color developer according to claim 1, wherein the aryl group is a phenyl group, an alpha-naphthyl group or a p-chlorophenyl group.

9. A color developer according to claim 1, wherein the aralkyl group has up to 7 carbon atoms.

10. A color developer according to claim 1, wherein the aryl group has up to 10 carbon atoms.

11. A color developer according to claim 10, wherein the aralkyl group has up to 7 carbon atoms.

* * * * *